United States Patent [19]

Kono et al.

[11] 3,990,792
[45] Nov. 9, 1976

[54] RECIPROCATING MOVEMENT CONTROL DEVICE

[75] Inventors: Toshihiro Kono, Kawasaki; Akiyoshi Torigai, Machida, both of Japan

[73] Assignee: Canon Kabushiki Kaisha, Tokyo, Japan

[22] Filed: Mar. 18, 1975

[21] Appl. No.: 559,636

[30] Foreign Application Priority Data
Mar. 23, 1974  Japan.............................. 49-32875

[52] U.S. Cl. .................................... 355/8; 74/526;
188/71.2; 188/82.1; 188/82.9; 192/12 BA;
192/143; 355/51; 355/66
[51] Int. Cl.² ...................................... G03G 15/30
[58] Field of Search .................... 355/8, 50, 51, 66;
74/526; 188/71.2, 82.1, 82.9; 192/12 BA, 143

[56] References Cited
UNITED STATES PATENTS

| | | | |
|---|---|---|---|
| 3,672,762 | 6/1972 | Suzuki et al. | 355/8 X |
| 3,740,133 | 6/1973 | Komori et al. | 355/8 |

*Primary Examiner*—L. T. Hix
*Assistant Examiner*—Kenneth C. Hutchison
*Attorney, Agent, or Firm*—Fitzpatrick, Cella, Harper & Scinto

[57] ABSTRACT

In a copying apparatus having an original carriage and an optical system, a reciprocating movement control device comprises a drive source for driving a photosensitive medium and drive transmission means effective only during forward movement to transmit the drive of the drive source to cause relative movement of the original carriage and the optical system. Righting moment accumulator means is provided for accumulating therein a righting moment with the aid of the drive source during the forward movement to cause backward movement of the original carriage or the optical system. The drive transmission means may be released by a scanning completion signal to thereby permit the righting moment accumulated in the accumulator means during forward movement to backwardly move the original carriage or the optical system and to control the speed of the backward movement.

14 Claims, 16 Drawing Figures

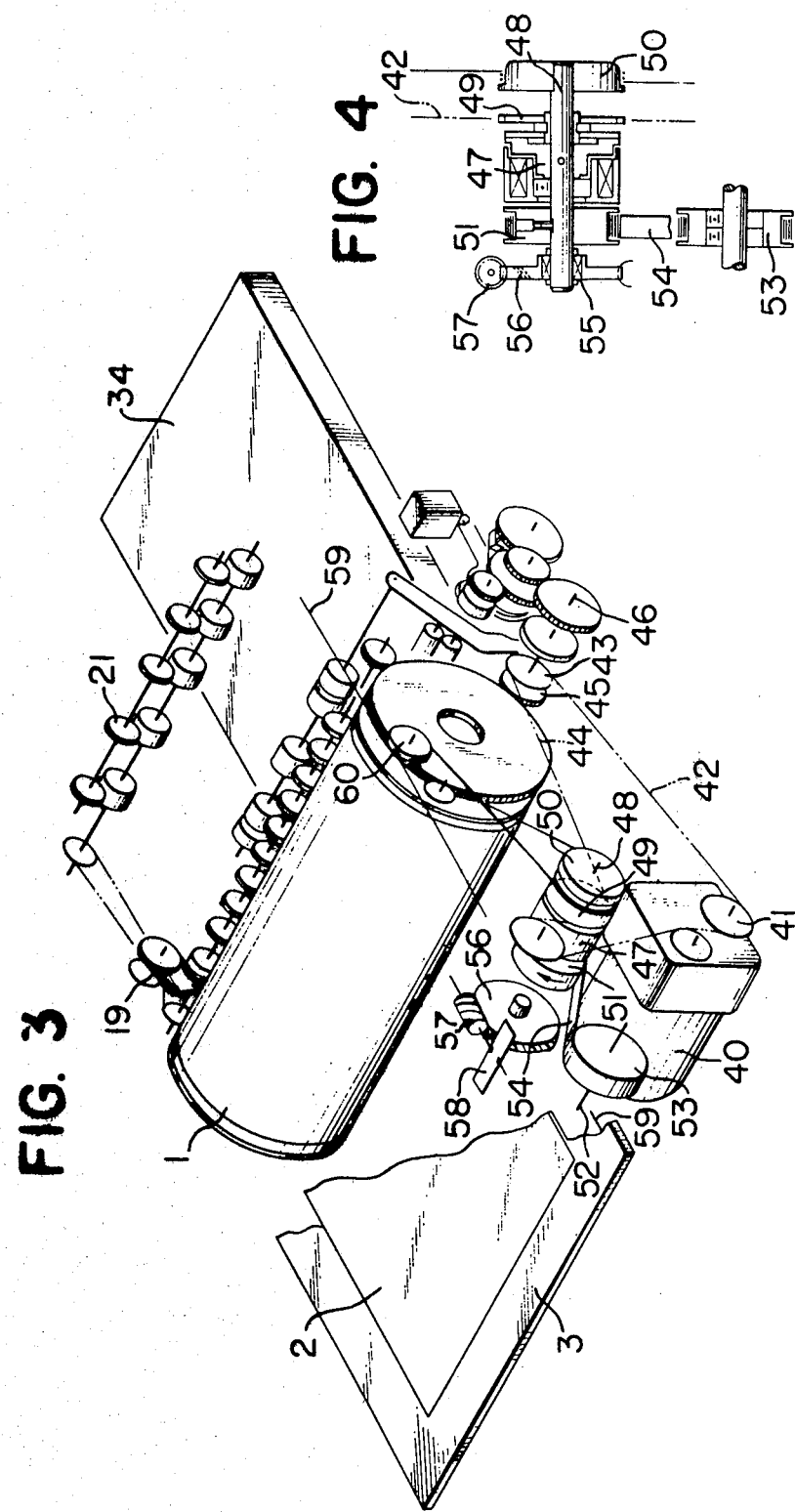

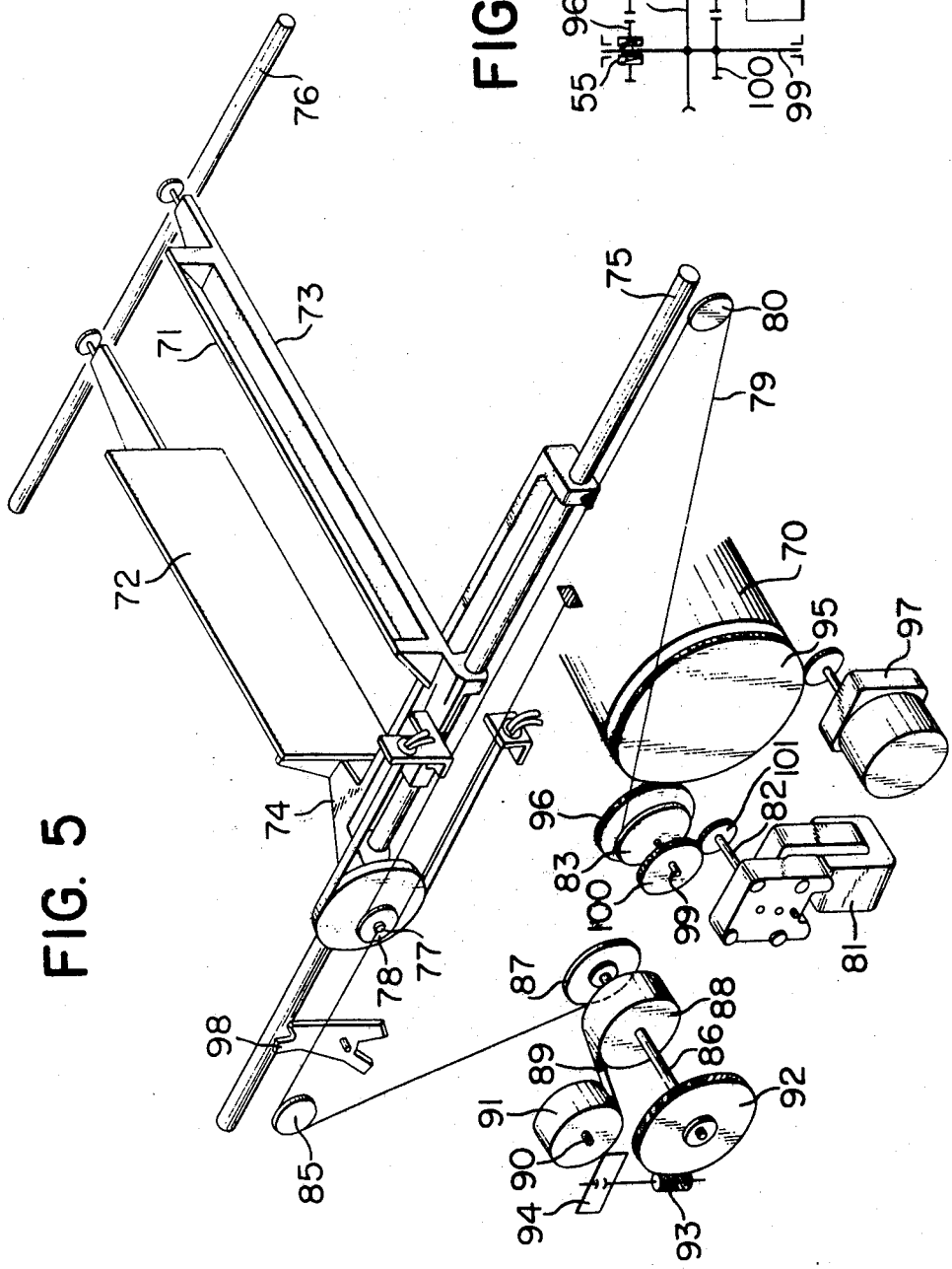
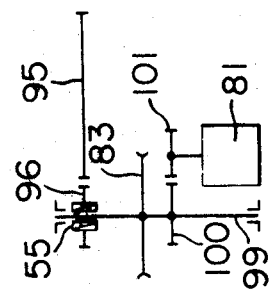
FIG. 5
FIG. 6

RECIPROCATING MOVEMENT CONTROL DEVICE

BACKGROUND OF THE INVENTION

1. Field of the Invention

This invention relates to a reciprocating movement control device for an optical system or an original carriage in a copying apparatus or the like. More particularly, it relates to a reverse driving device in a copying apparatus of the type wherein scanning of an original is effected by a driving system, especially, by relative movement of the original and the optical system, which device is for returning the optical system or the original carriage after the scanning has been completed. The invention also relates to a predetermined position stop mechanism for smoothly stopping a reciprocating original carriage at a predetermined position and for permitting the original carriage to start from the predetermined position without the stop means thereof providing any load, and to a movement control device for a reciprocating body which is applicable for an antivibration mechanism for the original carriage in a copying apparatus of the reciprocating original carriage type.

2. Description of the Prior Art

Heretofore, two clutches for normal and reverse rotations have been employed to effect the reciprocating movement of the described type and these clutches have selectively been operated to effect reciprocating movement of the original carriage or the optical system. However, if the clutches were electromagnetic ones, the drive has intermittently been transmitted with a great shock produced during reversal of the movement (i.e. during clutch change-over), which in turn has resulted in production of considerable vibrations of the entire apparatus which might cause failure of the apparatus or adversely affect the quality of formed image.

Also, in a copying apparatus of the reciprocating original carriage type, a shock occurs when the original carriage is stopped at its predetermined position, and, moreover, since a wire or like member which is not completely rigid but resilient has been employed to provide for a synchronization between the original carriage and the photosensitive medium, the synchronization during initial movement of the carriage and the photosensitive medium has suffered from some irregularity resulting from such factors as the dilation of the wire, the inertia of the original carriage, etc.

Such irregular synchronization has caused occurrence of a phenomenon that, at the leading end of a copy image to be produced, the image fails to be formed rectilinearly with a width which is substantially perpendicular to the direction of movement of the original (such phenomenon will hereinafter be referred to as "leading end blur").

SUMMARY OF THE INVENTION

It is an object of the present invention to provide a reciprocating movement control device for an optical system or an original carriage in a copying apparatus or the like.

It is another object of the present invention to provide a movement control device for reversing and starting the optical system or the original carriage.

It is still another object of the present invention to provide a movement control device for reversing the optical system or the original carriage with the aid of a righting moment accumulated during the forward movement.

It is yet still another object of the present invention to provide a movement control device for producing a resistance in proportion to the speed of forward or backward movement.

It is a further object of the present invention to provide a predetermined position stop mechanism for a reciprocating optical system or optical carriage and to provide a device for absorbing an inertia load.

According to the present invention, reverse driving of the original carriage or the optical system after completion of scanning may be effected by a resilient righting moment (energy stored in an energy-storing member) charged by the drive motor during the scanning stroke (for example, during the forward movement of the original carriage), and the scanning distance of the original carriage or the optical system is variable with the size of the copy (i.e. the size of original).

In this case, the righting moment (stored energy) of the spring or like resilient member is varied with the scanning distance and accordingly, the speed of the reverse movement changes continuously. Therefore, speed control means for making such speed constant is added to thereby enable the original carriage of the optical system to be returned at a predetermined speed independently of the scanning distance or the position thereof during backward movement.

In this regard, attention must be paid to the fact that the righting moment charged by the spring necessarily depends on the distance of travel of the original carriage and the position thereof during return movement and, accordingly, in the copying of a predetermined size, that the speed of return movement of the original carriage is varied from moment to moment and greatly accelerated by inertia of the carriage, and that similar problems occur when the copy size varies, and that the inertia of the original carriage when arriving at its home position exhibits considerable irregularities which will impart a great shock to the apparatus that will form a problem in stopping the original carriage at a predetermined position. In order to overcome these problems, it is indispensable for the sequence control of the apparatus to reverse the original carriage at a predetermined speed independently of the position (scanning distance) of the carriage.

Thus, according to the present invention, there is provided accelerator means comprising a worm wheel and a worm (these being combined together in a manner inverse to the conventional combination of a worm and a worm wheel, to provide accelerator means), and resistance means formed by viscosity of air and a fan after accelerator to produce a resistance proportional to the reversal speed of the original carriage, whereby speed reduction may be attained to ensure the original carriage to return to its initial position at a predetermined speed.

Further, spring means is provided to ensure the scanning system or the original carriage to undergo the righting moment of the spring even if they are momentarily subjected to a normal drive at their starting time, thereby eliminating the transient phenomenon which would otherwise be experienced in the speed of the scanning system of the original carriage during initial stage of the scanning (namely, the transient phenomenon until the speed is fixed to a predetermined value), and thus preventing the leading end image blur. Heretofore, the countermeasure for such transient phenomenon has been to provide a long distance of preparatory running (i.e. preliminary course preceding the scanning of the leading end of the mirror system or the original carriage), and this has increased the total scanning distance beyond the size of the original, which in turn has chiefly reduced the copying capacity for the same process speed (this has particularly been conspicuous in high-speed copying). This may be overcome by the present invention.

Furthermore, after the required scanning has been completed and at the moment the reversal is entered, the scanning system or the original carriage also has a considerable inertia force which will undesirably impart a great shock to the scanning system or the original carriage at the moment they are connected to reverse drive means. Such inconvenience is obviated by the present invention because the abrupt inertia force is absorbed by the righting moment of reversal spring.

In addition, according to an embodiment of the present invention, the normal drive means for the scanning system or the original carriage includes steady-state drive means for driving the photosensitive medium or the like, as well as another drive source, and said another drive source and the steady-state drive means are made integral with each other during forward movement, thereby reducing the influence of inertia load more effectively than by the use of clutches for control, and also preventing any synchronous vibrations of the scanning system or the original carriage and the photosensitive medium which would result from slip. Also, the use of a coupling motor or the like will lead to a lower cost.

Since the leading end blur, as previously noted, results from dilation of tracting means which is not completely rigid or from inertial movement of the tracted original carriage, the movement of the original carriage may be controlled substantially to a constant speed by making such a design that a force for attenuating the dilation of the tracting means and the inertia force of the original carriage to zero acts in a direction counter to the direction of movement of the original carriage. As a result, the original carriage may achieve an accurate synchronization with the photosensitive medium moving at a constant speed, whereby the leading end blur may be obviated.

It is also possible for the original carriage to accurately return to its predetermined position in order to ensure good movement of the original carriage for a subsequent cycle.

According to the present invention, it is further possible in a copying apparatus having an original keep cover to eliminate any undesirable misregistration of the original carriage which would occur when the original keep cover is raised and lowered to permit placement of an original on the carriage.

The above objects and features of the present invention will become more fully apparent from the following detailed description of some embodiments taken in conjunction with the accompanying drawings.

BRIEF DESCRIPTION OF THE DRAWINGS

FIG. 3 is a perspective view of a reverse driving device as applied to a copying apparatus of the type wherein the original carriage is reciprocally movable.

FIG. 4 is a cross-sectional view showing the drive of accelerator means during backward movement.

FIG. 5 is a perspective view of the present invention as applied to a copying apparatus of the type wherein the optical system is movable.

FIG. 6 illustrates the drive therein.

DESCRIPTION OF THE PREFERRED EMBODIMENTS

Figure 1:
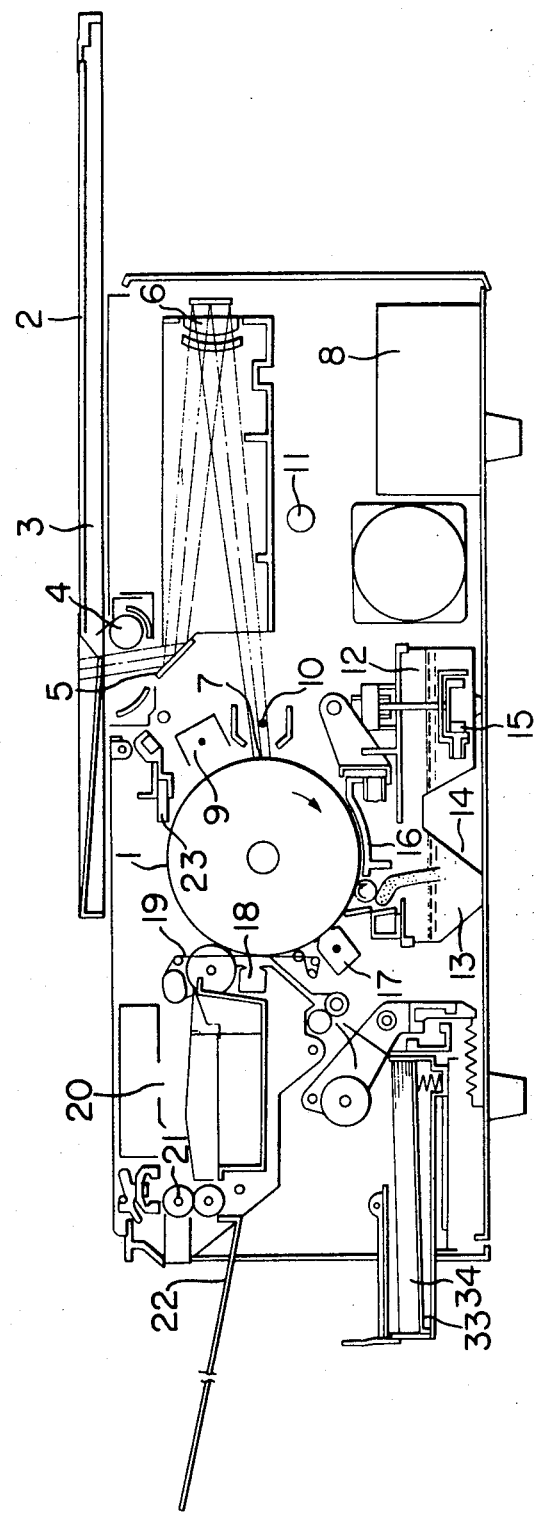
FIG. 1 is a longitudinal cross-section showing an example of the copying apparatus to which the reciprocating movement control device of the present invention is applicable.

Embodiments of the present invention will hereinafter be described. FIG. 1 shows an example of the copying apparatus of the movable original carriage type to which the present invention is applied.

When a rotating drum 1 has come round to a predetermined angular position, an original carriage 3 with an original place on an original carriage glass 2 starts to move and is illuminated from therebelow by an illuminating lamp 4. The image of the original is directed via a mirror 5 and an in-mirror lens 6 and focussed on the drum 1 in exposure portion 7.

The surface of the drum 1 comprises a photosensitive medium having a photosensitive layer convered with a transparent insulating layer, and the photosensitive medium is initially charged with positive polarity by a positive charger 9 supplied with a positive high voltage from a high voltage source 8.

Subsequently, when the drum has reached the exposure portion, it is slit-exposed to the image from the illuminating portion 4 while, at the same time, it is subjected to AC charge by an AC charger 10 supplied with high AC voltage from the high voltage source 8. The drum is then subjected to overall exposure by an overall exposure lamp 11, whereby an electrostatic latent image of high contrast is formed on the surface of the drum, whereafter the drum enters a developing process. A developing device 12 comprises a container 14 for developer 13 and a pump 15 for agitating the developer 13 and raising it to a developing electrode 16, which is arranged to always maintain a predetermined spacing with respect to the surface of the photosensitive drum 1. The electrostatic latent image formed on the photosensitive drum 1 is developed into a visible image by toner in the developer 13 raised to the developing electrode 16 by the pump 15.

Next, the photosenstive drum 1 is subjected to charge by a post-charger 17 supplied with negative voltage from the high voltage source 8 to squeeze out any excess developer on the drum without disturbing the image. A transfer medium 34 is then fed from a paper supply portion 33 and brought into intimate contact with the photosensitive drum 1, and charged by a transfer charger 18 supplied with a positive high voltage from the high voltage source 8, whereby the image on the photosensitive drum 1 is transferred onto the transfer medium 34.

After the image transfer has been done, the transfer medium 34 is separated from the drum 1 by a separator belt 19 and directed to a drying-fixing portion 20 for fixation, whereafter it is discharged by paper discharge rollers 21 onto a tray 22 for discharged paper.

On the other hand, any residual toner or developer on the photosensitive drum 1 is wiped off by the edge portion of a blade cleaner 33 urged against the drum and the developer so wiped off by the blade cleaner flows along grooves, formed on the opposite end portions of the photosensitive drum 1, and is directed into the developing device 12 for reuse as developing liquid.

Figure 2:
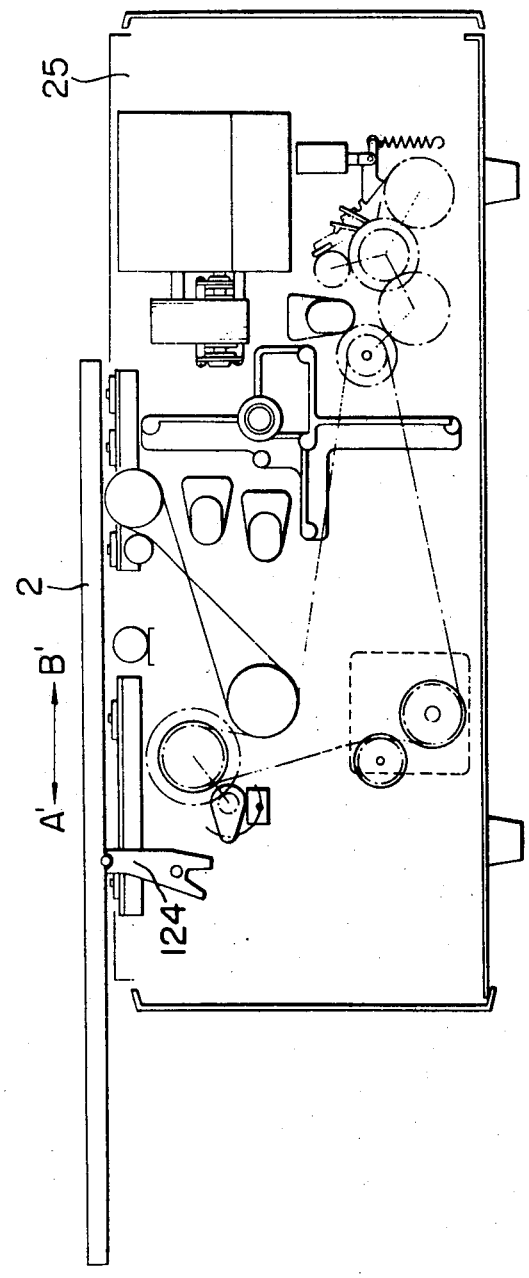
FIG. 2 is a longitudinal cross-section showing the back side of the FIG. 1 apparatus.

FIG. 2 is a back side view of the copying apparatus. The original carriage 8 reciprocates in the direction of double-headed arrow and may be stopped at a predetermined position by a predetermined position stop mechanism 124. The reason why the original carriage 3 must be stopped always at a predetermined position and started therefrom is that, unless the original carriage 3 is started always from such predetermined position when its reciprocating movement is repeated, the formed image on the drum could not have the leading end thereof aligned with a predetermined location on the drum and accordingly with the leading end of the transfer paper.

With reference to FIGS. 3 and 4, a reverse driving mechanism as applied to the above-described apparatus will now be explained. The drive of a main motor M1 40 is transmitted through a sprocket wheel 41 and a chain 42 to a sprocket 43 to drive a drum driving shaft 46 on one end of which a gear 45 is securely mounted and in meshing engagement with a drum gear 44, and further to drive a sprocket wheel 49 rotatably mounted on the shaft 48 of an electromagnetic clutch CL1 47 for normal rotation. An original carriage driving pulley 50 is further securely mounted on the shaft 48 of the electromagnetic clutch CL1 47, and a spring take-up pulley 51 is also securely mounted on the clutch shaft 48. A stationary shaft 52 is provided substantially parallel to the clutch shaft 48, and a rewind pulley 53 is rotatably mounted on the stationary shaft 52. A resilient member such as spiral spring 54 is stretched between the rewind pulley 53 and the take-up pulley 51 and has the opposite ends thereof secured to these pulleys. The spiral spring 54 is designed to normally rotate the take-up pulley 51 in the direction of the arrow. A worm wheel 56 is further mounted on the clutch shaft 48 with a one-way clutch 55 interposed therebetween, and a worm 57 is engaged with the worm wheel 56 and rotatably journalled. A propeller fan 58 is secured to one end of the worm 57 which is adjacent to the worm wheel 56.

A length of original carriage driving wire 59 is wound on the carriage driving pulley 50 for several turns and passes over a guide pulley 60, and the opposite ends of the wire 59 are secured to the forward and rearward ends of a back angle forming the carriage 3.

With such construction, during the forward movement of the original carriage, the drive from the main motor 40 is transmitted through the electromagnetic clutch CL1 47 to drive the clutch shaft 48 counterclockwise and accordingly rotate the original carriage driving pulley 50 securely mounted on the clutch shaft 48, so that the original carriage 3 is moved in synchronism with the photosensitive drum 1 by the wire 59 while, at the same time, the take-up pulley 51 secured to the shaft 48 is rotated in the same direction to rewind the spiral spring 54 from the rewind pulley 53 to change the same. The worm wheel 56 mounted on the shaft 48 with the one-way clutch 55 interposed therebetween remains stationary since the one-way clutch 55 is operated in the direction to be free during the forward movement of the original carriage. After the original carriage has thus been moved over a distance corresponding to the copy size selected, the electromagnetic clutch CL1 47 is deenergized by a certain signal, whereupon the clutch shaft 48 is liberated from the drive of the main motor M1 and now is driven clockwise by the spiral spring 54 which has bee charged during the forward movement of the carriage, so that the original carriage driving pulley 51 on the shaft 48 is reversed at the same time to return the original carriage to its initial position. Also, during the reversal of the original carriage — when the clutch shaft 48 is being driven clockwise — the one-way clutch 55 is operated to transmit the drive of the clutch shaft 48 to the worm wheel 56, which in turn accelerates the worm 57 at a ratio inversely proportional to the number of teeth of the wheel 56, so that the worm 57 is accelerated to a speed several times to several tens of times the return speed of the original carriage 3, thereby controlling the speed of the clutch shaft 48 by means of the air resistance of the fan 58 secured to the end of the worm 57. As is already obvious, a negative feedback is applied to the original carriage 3 by a speed-proportional resistor integrally engaged with the carriage 3 to control the carriage always to a predetermined speed even if the righting moment of the spiral spring 54 is varied to accelerate the original carriage 3. The resistor means may most preferably be a speed-proportional resistor but friction resistance means between solid matters may also be employed to gain a considerable success.

FIGS. 5 and 6 show an embodiment as applied to a copying apparatus of the type in which the original carriage is stationary but the scanning mirror is movable to scan an object to be copied.

The present embodiment employs a first mirror 71 movable at a speed equal to that of a photosensitive medium 70 and a second mirror 72 movable at half the speed of the first mirror 71, in order to scan an original on the stationary original carriage. The scanning is effected with the length of the optical path from the stationary lens to the surface of the original to be copied being maintained constant. A first mirror bed 73 is usually provided with an illuminating lamp. The first mirror bed 73 and a second mirror bed 74 are slidably supported on a reference rail 75 and a supporting rail disposed parallel to the reference rail 75. A support shaft 77 secured to the second mirror bed 74 has a pulley 78 rotatably supported thereon. A mirror driving wire 79 has one end thereof secured to the main body of the apparatus and the other end portion of the wire 79 is passed over the pulley 78 and secured at a point to the first mirror bed 73 so that the first mirror and the second mirror 72 may have a predetermined position relationship, and thence passed over a first deflecting pulley 80 rotatably supported on a shaft secured to the main body, and then wound for several turns on a driving pulley 83 securely mounted on a mirror system driving shaft 99 rotatably journalled to the side plates of the main body, whereafter the other end of the wire 79 is secured to the pulley 83. A wire 84 for backwardly moving the mirror system has one end secured to the shaft 77 on the second mirror bed 74 and the other end portion of the wire 84 is passed over a second deflecting pulley 85 rotatably supported on a shaft secured to the main body, whereafter said other end portion of the wire 84 is wound for several turns and secured onto a pulley 87 securely mounted on a rewind shaft 86 extending between and rotatably journalled to the main body side plates and auxiliary side plates. A rewind pulley 88 is securely mounted on the rewind shaft 86. A spiral spring 89 is secured at one end to the rewind pulley 88, and the other end portion of the spiral spring is wound for several turns and secured onto a take-up pulley 91 rotatably mounted on a stationary shaft 90 extending parallel to the rewind shaft 86. As previously described, a worm wheel 92 is mounted on the other end of the rewind shaft 86 with a one-way clutch interposed therebetween, and a worm 93 is engaged with the worm wheel 92 and a damper fan 94 is secured to one end of the worm 93. A gear 96, which engages a drum gear 95 through a one-way clutch 55, is mounted on one end of the mirror driving shaft 99. The one-way clutch 55 is designed such that it transmits the drive from the mirror driving shaft 99 to the gear 96 when the mirror driving motor 81 is rotated in a direction for forwardly moving the mirror system, and that it becomes free when the mirror system is moved forwardly. Also, the peripheral speed of the gear 96 on the mirror driving shaft 99 is slightly higher than that of the drum gear 95 so that a mirror driving motor 97 and the mirror driving motor 81 are coupled together through the one-way clutch 55 during the forward movement of the mirror system, to thereby drive the photosensitive drum 70 and the mirror system at a predetermined speed. After scanning has been effected over a predetermined stroke, the mirror driving motor 81 is electrically deenergized, whereupon the mirror system is moved backwardly to its initial position by the righting moment of the spiral spring 89 charged during the forward movement. During that time, the drum 70 and accordingly the drum 95 continue to rotate in a predetermined direction but disconnected by the one-way clutch 55 from the mirror driving pulley 83.

Disposed adjacent the home position of the mirror system is a predetermined position stop device 98, which will further be described, so as to quickly apply a brake to the mirror system when it comes backwardly at a high speed, thereby absorbing the inertia of the mirror system and stopping it at a predetermined position.

Figure 7:
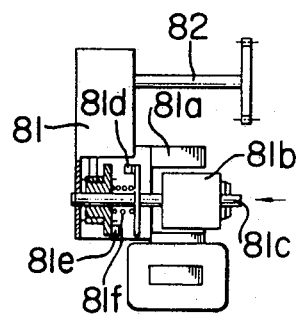
FIG. 7 shows, in cross-section, the construction of a coupling motor.

The coupling motor 81 being used on the mirror system's forward stroke side, as in the present embodiment, can alleviate the shock of the mirror system during initiation of the scanning and in addition, enhances the rising characteristic because the motor is engaged by a load only after it has made a predetermined angular rotation independently of the load. Details of the coupling motor are shown in FIG. 7. The rotor 81b of this motor is normally biased rightwardly by a spring 81f to bring coupling discs 81d and 81e into engagement with each other to thereby transmit the drive force, and the motor has a good rising characteristic because it is out of engagement with the load during the start thereof.

The coupling motor used as the mirror driving motor 81 may be replaced by a combination of a conventional induction motor and a speed reduction means for reducing the speed of the induction motor to a predetermined number of revolutions, and in such case, the aforementioned overshoot may be prevented when, after completion of the forward movement, the mirror driving motor 81 is deenergized to permit backward movement to be imparted by the resilient member charged during the forward movement of the carriage. More specifically, during the reversal, the mirror system on the original carriage tends to rapidly accelerate by the righting moment of the resilient member, but with the arrangement described just above, the solid friction essentially present between gears of a gear train forming the speed reduction means and the inertia of the rotor of the motor itself (which is accumulated by the gear train during reversal) will produce a force in a direction to negate the aforesaid overshoot of reversal speed — rapid acceleration — and accordingly, there may be expected an effect similar to the aforementioned speed feedback. Thus, in this case, the previously described speed feedback device may be eliminated. As is already apparent, the effect may be further enhanced by connecting the aforesaid fan or friction load to the rotor shaft of the mirror driving motor. Also, a similar speed control effect may be obtained by applying a lower operating voltage during backward movement than during forward movement (rated voltage of the motor) to thereby operate the motor under slipping condition.

Further, the return wire 84 being secured to the second mirror bed permits the latter to be moved only over one-half of the scanning distance and this may reduce variation in the backward drive force.

In addition, the damper fan is not only useful for the speed control but also the wind produced thereby may be utilized to cool down the exhaust air or the motor.

Figure 8:
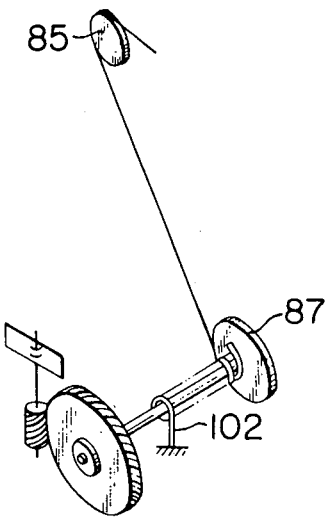
FIG. 8 is a fragmentary perspective view showing another backward moving means in the reverse driving device.

FIG. 8 shows another embodiment of the backward driving portion. In this embodiment, a coil spring 102 has one end portion thereof secured to a rewind pulley and wound for several turns on a rewind shaft, whereafter the other end of the coil spring is secured to a stop on the main body.

The predetermined position stop mechanism will now be described with reference to FIGS. 9 and 10.

A back side plate 125 has an angle bracket 126 secured thereto, which in turn has secured thereto a lower rail 127 on which the original carriage 3 is moved. An upper rail 128 is secured to the rearward mount 129 of the original carriage. The original carriage 3 is reciprocally movable by means of steel balls.

The base 132 of the predetermined position stop mechanism is secured to the back side plate 125 and has a main shaft 131 secured thereto.

Bearings 135 and 136 are rotatably mounted on the main shaft 131. A lock lever fixing collar 137 is fitted to the bearing 135 and has a lock lever 124 fixed thereto.

A brake disc 138 is fitted on the bearing 136 and held by and between brake shoes 139 and 140. A portion of the brake shoe 140 is urged in the direction of the arrow by a spring 141, whereby a friction force will act between the brake disc 138 and the brake shoes 139, 140 when the brake disc 138 tries to rotate between the brake shoes.

Figure 9:
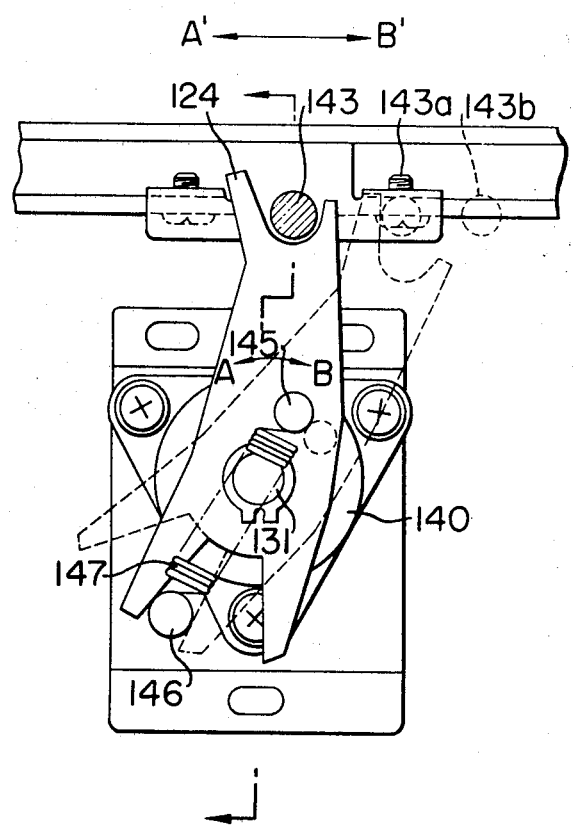
FIGS. 9 and 10 are longitudinal cross-section of a predetermined position stop mechanism.
Figure 10:
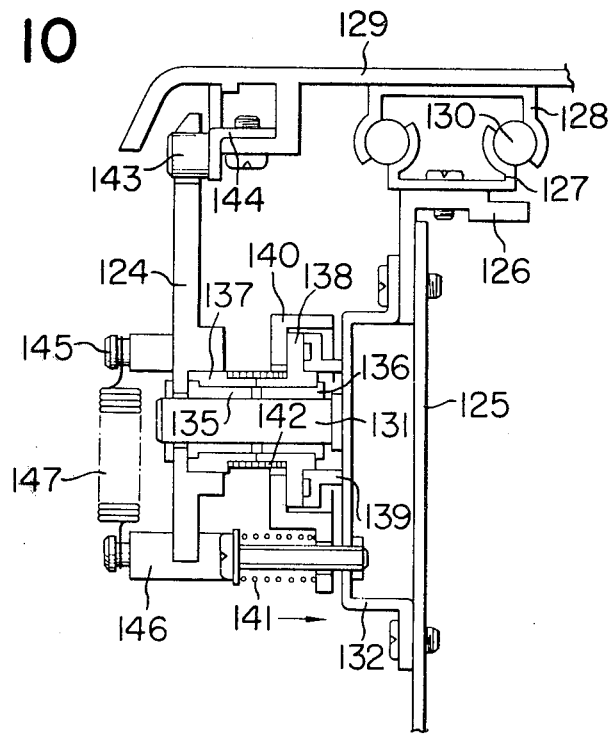

Designated by 142 is a spring clutch which, when the lock lever 124 tries to rotate in the direction of arrow A in FIG. 9, is effective to transmit the movement of the lock lever to the brake disc 138 through the fixing collar 137, and when the lock lever 124 tries to rotate in the direction of arrow B, is not effective to transmit the movement of the lock lever. A pin 143 is secured to a pin mounting plate 144 which is secured to the rearward mount 129. The pin 143 is received in a groove in the lock lever 124 when the original carriage is at its predetermined stop position (the position indicated by solid lines in FIG. 9).

A spring hooking shaft 145 is secured to the lock lever 124 and a shaft 146 is also secured to the base 132.

A coil spring 147 extends between and is secured to the two shafts. When the center line of the coil spring lies on the left of the center of the shaft 131 as viewed in FIG. 9, the coil spring biases the lock lever 124 in the direction A, and when the center line lies on the right of the center of the shaft 131, the coil spring biases the lock lever 124 in the direction B.

With the above-described construction, when the original carriage tries to start from its predetermined stop position (the position of the pin 143 indicated by solid line in FIG. 9), an initial small section of the carriage movement will experience some force opposing the bias of the lock lever 124 imparted by the spring 146 in the direction A, but such section may be minimized by suitably selecting the locations of the shafts 145 and 146 so that once the center line of the spring 147 has passed beyond the center of the shaft 131, there will be no barrier or load opposing the movement of the original carriage in the direction of arrow B'.

In other words, the friction force (braking force) imparted to the brake disc 138 by the brake shoes 139, 140 is interrupted at the spring clutch 142 with respect to the movement of the lever 124 in the direction B and accordingly, will not form any load with respect to the movement of the original carrriage in the direction B', thus enabling smooth start of the original carriage. The lock lever 124 assumes its dotted-line position to become ready for the backward movement of the original carriage.

During the backward movement (direction A' in FIG. 9) of the original carriage, when the pin 143 has come to the position 143a indicated by dotted line, there is a force acting to move the lock lever 124 in the direction A (the original carriage is not disconnected from the direction-A drive source a little short of the point 143a), so that the lock lever 124 tries to move from its dotted-line position to its solid-line position but at this moment, the lock lever 124 is connected to the brake disc 138 by the spring clutch 142, whereby the friction force (braking force) between the brake disc 138 and the brake shoes 139, 140 is transmitted to the lock lever 124 to resist the movement of the pin 143 and in addition, the lock lever 124 is also subjected to the direction-B force by the spring 146 until the center line of the spring 146 passes beyond the center of the shaft 131, so that the pin 143 undergoes a great braking force until it is stopped at its solid-line position 143.

In the manner described above, the original carriage may be stopped at its predetermined position by the predetermined position stop mechanism and may be started from such position without any load imparted to the stop mechanism. The present mechanism has been described with respect to its application to the original carriage, but it will be apparent that it is equally applicable to movement of the optical system (the mirror system or the lens system for scanning an object).

An embodiment of the movement control mechanism will now be described in detail.

Figure 11:
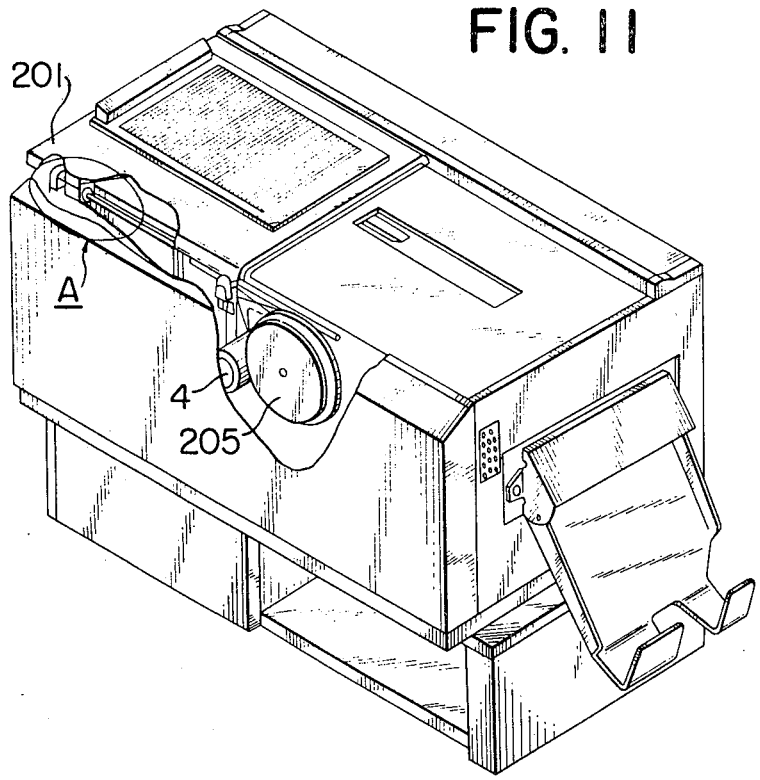
FIG. 11 is a perspective view of a conventional copying apparatus of the type wherein the original carriage reciprocates.
Figure 12:
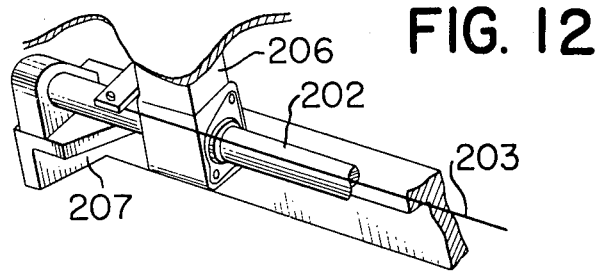
FIG. 12 is a detailed perspective view of a portion A of FIG. 11.

In FIGS. 11 and 12 showing a conventional copying apparatus of the movable carriage type to which the present mechanism is applicable, numeral 201 designates a reciprocating original carriage, 202 a rail for guiding the reciprocally movable original carriage, 203 a wire for moving the original carriage in synchronism with a photosensitive drum, 204 a drive motor reciprocating the original carriage and for rotating the photosensitive drum, 205 a pulley integral with the photosensitive drum to rotatively drive the same, 206 an original carriage guide member, and 207 a rail support member secured to the main body of the apparatus.

Figure 13:
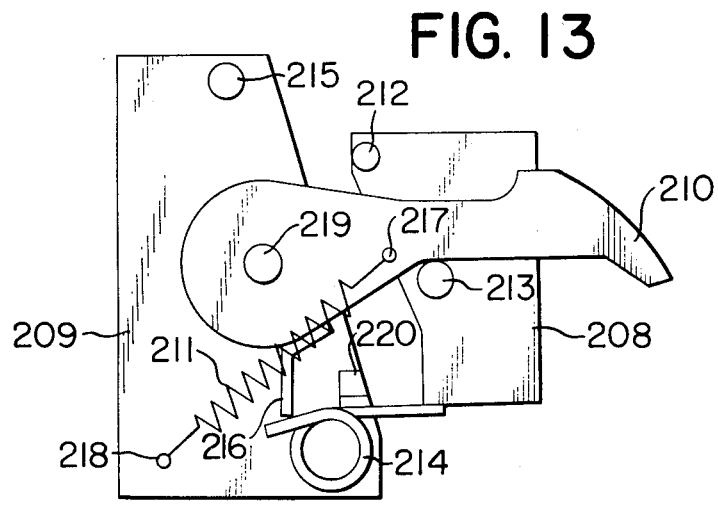
FIGS. 13, 14, 15 and 16 illustrate an anti-vibrating device.
Figure 14:
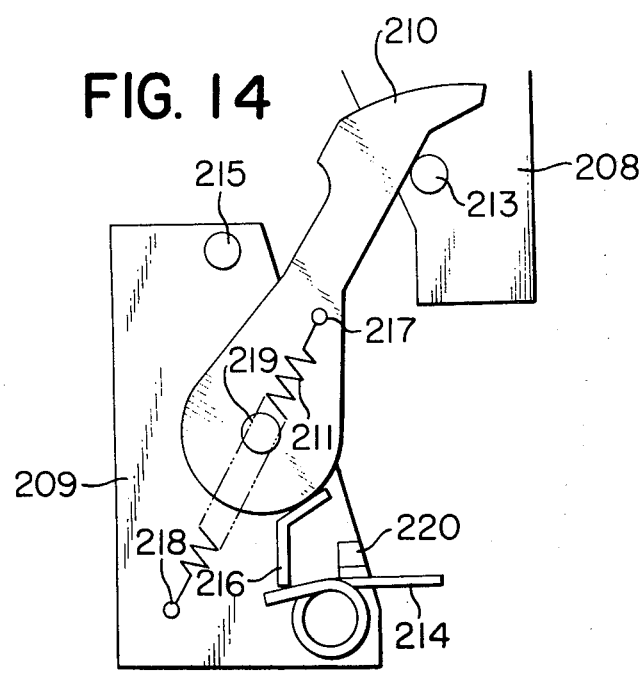

Referring to FIG. 13, 208 designates a movable member secured to the original carriage, 209 a stationary base plate fixed to the main body, 210 an anti-vibration lever pivotable about a shaft 219 secured onto the stationary base plate 209, and 211 a tension spring having one end thereof hooked to a spring hook 207 on the anti-vibration lever 210 and the other end hooked to a spring hook 218 on the stationary base plate 209. First, with initiation of movement of the original carriage, the movable member 208 secured to the carriage is moved. At the same time, a push member 213 secured onto the movable member 208 is moved to displace the anti-vibration lever 210 upwardly in the drawing against the force of the spring 211 which imparts clockwise rotational force to the anti-vibration lever 210. The spring 211 exerts its tensile force in a direction for suppressing the movement of the original carriage, thus suppressing the inertial movement of the original carriage. The tensile force of the spring 211 may prevent vibration of the original carriage. The anti-vibration lever is rotated counter-clockwise, as viewed in the drawing, until it assumes a position as shown in FIG. 14. As the anti-vibration lever 210 is further rotated counter-clockwise, the tensile force of the spring 211 rotates the anti-vibration lever 210 independently of the movement of the movable member 208 until the lever 210 is stopped by a stop 215 secured to the stationary base plate 209, with a result that the lever 210 assumes a position as shown in FIG. 15.

Figure 15:
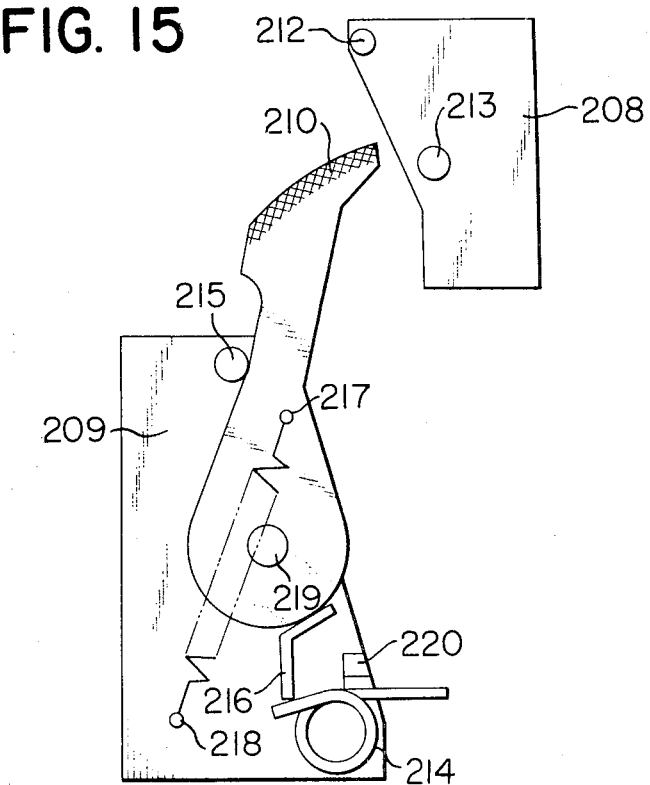
Figure 16:
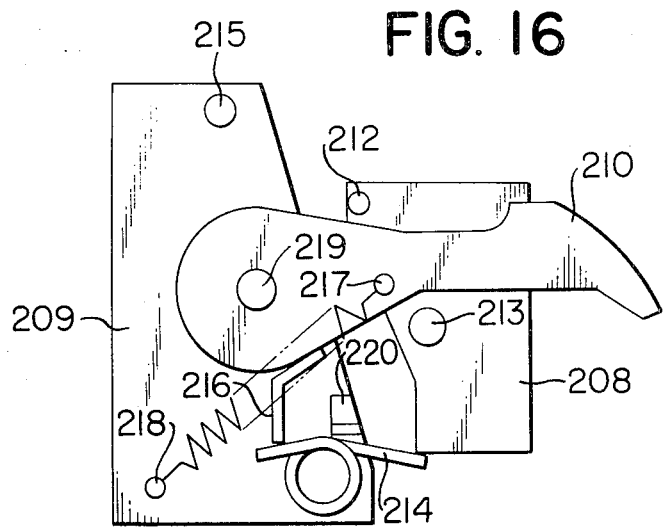

Next, for the return stroke of the original carriage, the movable member is moved downwardly from the position of FIG. 15. At this time, the push member 213 passes by the anti-vibration lever 210 and another push member 212 secured onto the movable member pushes the shaded portion of the anti-vibration lever 210. The anti-vibration lever 210 is rotated clockwise in the drawing by the push member 212 and on its way, it is caused by the tensile force of the spring 211 to pass through the position of FIG. 16 and return to the position of FIG. 13. Thereupon, the movable member and accordingly the original carriage is caused to strike against a buffer spring 214 by the tensile force of the spring 211, whereby the shock is alleviated.

Clockwise and counter-clockwise rotation of the buffer spring 214 may be stopped by a spring stop 220 and a stop 216 on the stationary base plate 209. The stop 216 also serves to stop clockwise rotation of the anti-vibration lever 210. The original carriage has its shock alleviated by the buffer spring 214 and may maintain its predetermined position by being held between the anti-vibration lever 210 and the buffer spring 214. Thus, according to the present invention, a single anti-vibration lever 210 performs two functions and this leads to symplification of the construction.

In the present embodiment, the anti-vibration lever 210 has been described as being pivotable about the shaft 219, but any type of anti-vibration lever may be employed which is vertically movable or which is vertically movable and rotatable to impart a braking force to the movable member. It will also be apparent that the spring 211 used to impart the braking force may be replaced by a resilient member of rubber or other elastic material.

Further, the movement control mechanism has been described with respect to its application to the original carriage of a copying apparatus, whereas it is also applicable as a control device for other reciprocating bodies.

We claim:

1. A control device for a copying apparatus, comprising a body mounted for reciprocating movement; stop means for stopping said body at a stop position at one end of the path of reciprocating movement; brake means for selectively imparting braking forces to said reciprocating body; said brake means including a pivotally mounted member for controlling said braking forces, means for pivotally moving said member in a first direction when said reciprocating body is moved forwardly away from said stop means, wherein said braking means applies a first braking force to said movable body at the commencement of said forward movement, and means for pivotally moving said member in a second direction when said reciprocating body is moved rearwardly toward said stop means, wherein said braking means applies a second braking force to said movable body as the latter moves rearwardly and approaches said stopping means, and wherein said brake means includes means for releasably maintaining said movable body in sait stop position at the termination of forward and rearward reciprocal movement of said body.

2. A control device according to claim 1, wherein the direction of movement of said pivotable member changes in response to changes in direction of movement of said reciprocating movable body.

3. A control device according to claim 1, wherein said brake means includes a device for exerting a braking force on said reciprocating body, and a spring clutch for coupling pivotal movement of said pivotal member to actuate said braking device.

4. A control device according to claim 1, wherein said stop means includes a spring for releasably holding said reciprocating body at said stop position.

5. A control device according to claim 1, wherein said brake means includes friction means for applying at least one of said first and second braking forces.

6. A control device according to claim 5, wherein said friction means comprises a braking disk and a braking shoe coupled respectively to said pivotal member and said movable body to provide a friction braking force.

7. A control device according to claim 1, further comprising means for controlling the speed of movement of said reciprocating body in the rearward direction.

8. A control device according to claim 7, wherein said speed control means includes means for exerting a braking force proportional to the speed of rearward movement of said reciprocating body.

9. A control device according to claim 7, wherein said speed control means includes accelerating means and a fan.

10. A control device according to claim 7, including drive means for causing rearward movement of said reciprocating body by utilizing energy accumulated during the forward movement of said reciprocating body.

11. A control device according to claim 10, wherein said drive means includes a spring for accumulating energy.

12. A control device according to claim 1, wherein said braking means further includes tension spring means connected to said member for resisting its movement by each of said pivotal moving means to thereby apply braking force to said reciprocally movable body.

13. A control device according to claim 1, wherein said means for pivotally moving said member in said first and second directions each include a projection formed on said movable body and engageable with said member.

14. A control device according to claim 13, wherein said projections are engageable with opposed surface regions of said member.

* * * * *